United States Patent
Ambrose

(10) Patent No.: US 7,246,171 B1
(45) Date of Patent: Jul. 17, 2007

(54) SYSTEM AND METHOD FOR MANAGING DATA TRANSMISSIONS FROM A TFTP SERVER BY SPECIFYING A MAXIMUM BANDWIDTH

(75) Inventor: Barry E. Ambrose, Pasadena, CA (US)

(73) Assignee: Nortel Networks Limited, Quebec (CA)

( * ) Notice: Subject to any disclaimer, the term of this patent is extended or adjusted under 35 U.S.C. 154(b) by 995 days.

(21) Appl. No.: 09/736,210

(22) Filed: Dec. 15, 2000

(51) Int. Cl.
G06F 15/16 (2006.01)
(52) U.S. Cl. .................. 709/233; 709/232; 370/468
(58) Field of Classification Search ............... 709/233, 709/232; 370/236, 468, 2; 725/10
See application file for complete search history.

(56) References Cited

U.S. PATENT DOCUMENTS 6,397,258 B1 * 5/2002 Tsuji et al. ................. 709/233
6,563,794 B1 * 5/2003 Takashima et al. ......... 370/236
6,574,797 B1 * 6/2003 Naegeli et al. ............. 725/120

OTHER PUBLICATIONS

K. Sollins, Network Working Group Request for Comments: 1350, STD: 33, Obsoletes: RFC 783, "The TFTP Protocol (Revision 2)", 9 pages, Jul. 1992.
K. Sollins, Network Working Group Request for Comments: 783, Updates: IEN 133, "The TFTP Protocol (Revision 2)", 8 pages, Jun. 1981.
CPS 2000 System Administrator's Guide, "TFTP Server on Windows NT", pp. 19-1 to 19-6, 20-1 to 20-3.

* cited by examiner

*Primary Examiner*—Jason Cardone
*Assistant Examiner*—Adnan M. Mirza
(74) *Attorney, Agent, or Firm*—Hunton & Williams LLP

(57) ABSTRACT

A system and method for delaying data transmissions from a server. A system administrator may specify a maximum bandwidth and a maximum number of sessions to be used for transmitting one or more data transmissions from the server. A delay may be calculated based on the maximum bandwidth, maximum number of sessions, and a packet size used for transmitting the data transmission. The data transmission may not be transmitted until the delay calculated has expired.

20 Claims, 4 Drawing Sheets

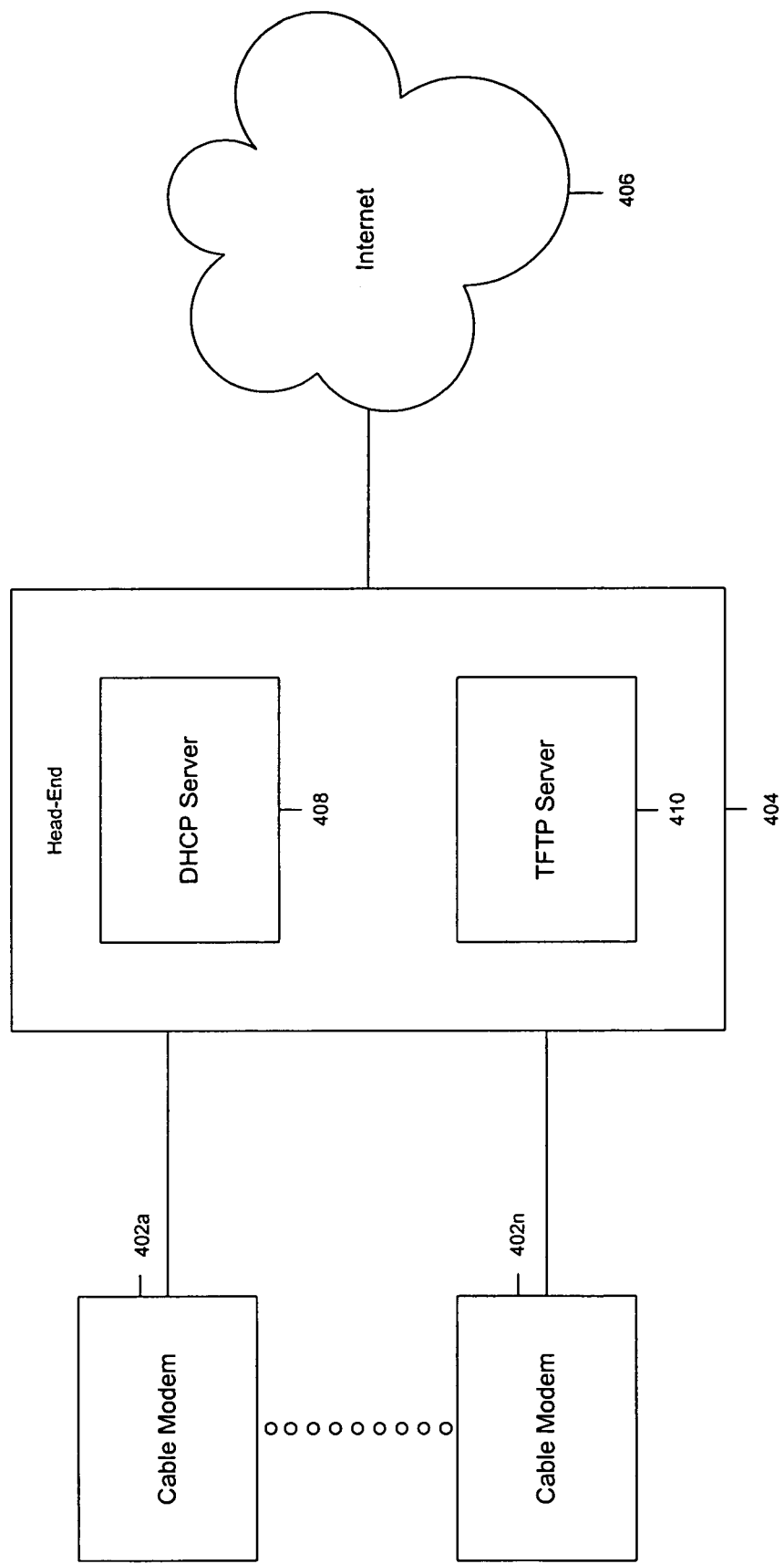

SYSTEM AND METHOD FOR MANAGING DATA TRANSMISSIONS FROM A TFTP SERVER BY SPECIFYING A MAXIMUM BANDWIDTH

FIELD OF THE INVENTION

The invention relates to a system and method for transmitting data. More particularly, the invention relates to a system and method for delaying transmission of data packets from a trivial file transfer protocol (TFTP) server by specifying a maximum bandwidth to use for a data transmission.

BACKGROUND OF THE INVENTION

The TFTP is known. The TFTP enables devices, for example, cable modems, to receive configuration files from a server at start-up. The TFTP operates on a user datagram protocol (UDP) to obtain configuration files. At start-up, a device typically determines an Internet protocol (IP) address for the device and then obtains configuration files using the TFTP. The steps used by a device for obtaining configuration files typically conform to the Cablelabs certified™ cable modem project, formerly known as Data Over Cable Service Interface Specification (DOCSIS™). The Cablelabs Certified™ cable modem project defines interface requirements for cable modems involved in high-speed data distribution over cable television system networks. The Cablelabs Certified™ cable modem project may be used as a standard for obtaining configuration files using the TFTP.

Devices such as cable modems are typically an always-on device. That is, the device may be always powered-on. Thus, if a power outage occurs and power is restored substantially simultaneously, multiple cable modems may request configuration files substantially simultaneously from a TFTP server if the cable modems power is restored substantially simultaneously. This may result in an overload at the TFTP server. The TFTP server may receive multiple configuration file requests and be unable to process each request. As configuration file requests are sent to the TFTP server, the responses may be stored in buffers as the response is relayed by routers and other networking equipment to the cable modem. If multiple responses are transmitted substantially simultaneously, the buffer may reach capacity before all responses are sent. This may result in responses being lost, time-outs occurring, retransmission requests from cable modems that do not receive a reply to a request within a predetermined period of time, or dropped connections. This is inefficient.

Requests for configuration files using the TFTP may be transmitted to a TFTP server. The TFTP server may permit multiple sessions to operate simultaneously. A session may be a communication from one cable modem to the TFTP server. Therefore, multiple cable modems may request configuration files from the TFTP server substantially simultaneously.

Data transmissions using the TFTP typically are not limited in transmission rates. Therefore, data transmissions that include sending packets of data from a TFTP server may transmit the packets faster than an available bandwidth can sustain, for example, if multiple requests are received substantially simultaneously by the TFTP server. This may result in packets being lost, time-outs, retransmissions, or dropped connections.

These and other drawbacks exist.

SUMMARY OF THE INVENTION

The invention solving these and other problems relates to a system and method for delaying data transmissions from a TFTP server. The system enables a system administrator, for example, a cable company system administrator, to specify a maximum bandwidth, and possibly, a maximum number of sessions, for use in sending data transmissions. The system administrator may specify a maximum bandwidth and maximum number of sessions for a data transmission. Based on the maximum bandwidth and/or number of sessions, the system may calculate a delay for sending a data transmission. Therefore, each data transmission may be delayed until a predetermined time. This reduces a number of data transmissions that may be transmitted within a given period of time. Therefore, the data transmissions sent may not exceed a predetermined available bandwidth, thus reducing a number of packet losses, time-outs, retransmissions, dropped connections or other problems that may occur.

BRIEF DESCRIPTION OF THE DRAWINGS

FIG. 4 is schematic block diagram of an overall cable network system according to one embodiment of the invention.

DETAILED DESCRIPTION OF THE PREFERRED EMBODIMENTS

The invention relates in one regard to a system and method for delaying data transmissions from a TFTP server. The invention enables a system administrator to specify a maximum bandwidth, or other parameter, for at least one data transmission. Based on the maximum bandwidth, a delay may be calculated for sending the data transmission.

Figure 1:
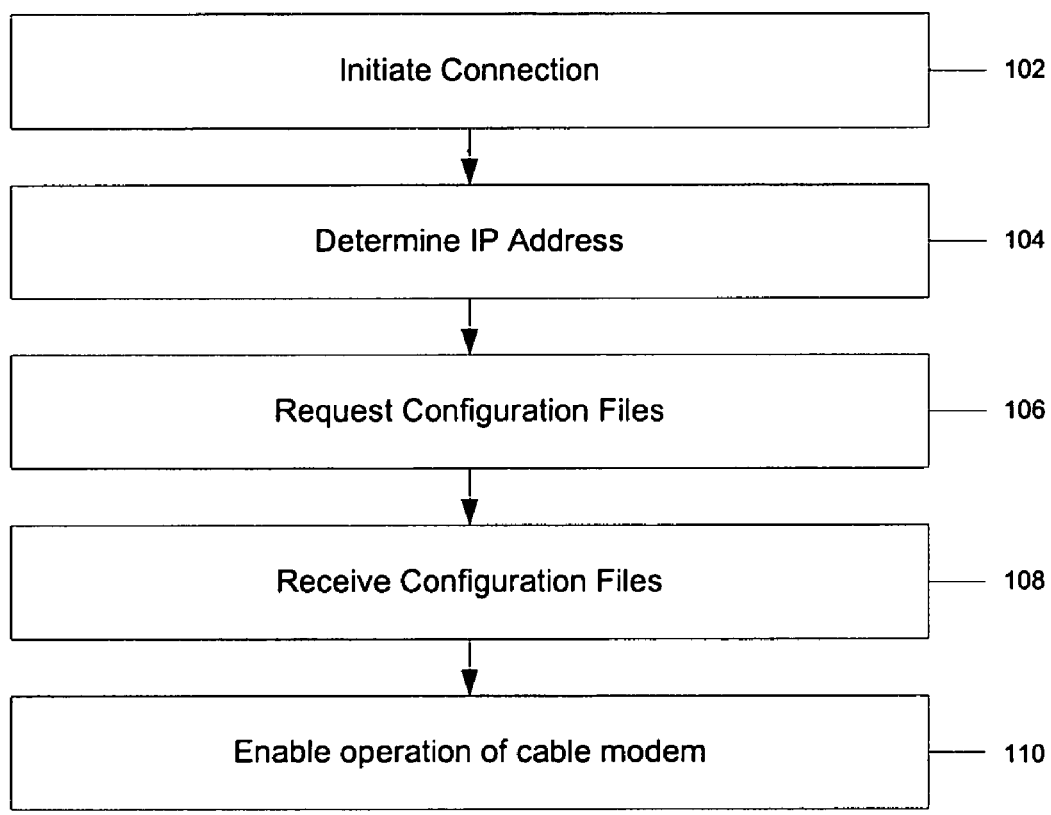
FIG. 1 is a schematic block diagram of a method for transmitting data transmissions according to one embodiment of the invention.

FIG. 1 illustrates a method for sending data transmissions according to one embodiment of the invention. The method may be used with end-user devices, for example, cable modems. At start-up, for example, when a cable modem is turned-on, the cable modem may initiate a connection to, for example, a Dynamic Host Configuration Protocol (DHCP) server in step 102. After initiating a connection, the cable modem may determine an Internet protocol (IP) address for the modem in step 104. The cable modem may request its IP address, an IP address for a TFTP server storing configuration files for the modem, and a name(s) of the configuration file(s) for the modem from DHCP server. The DHCP server may return this and/or other information to the cable modem enabling configuration of the cable modem. The cable modem may then request the configuration file(s) from the TFTP server in step 106 for configuring the cable modem. The configuration files enable the cable modem to communicate with the TFTP server. The cable modem may then become operational in step 110. A cable modem user may then use the cable modem to connect to, for example, the Internet.

Figure 2:
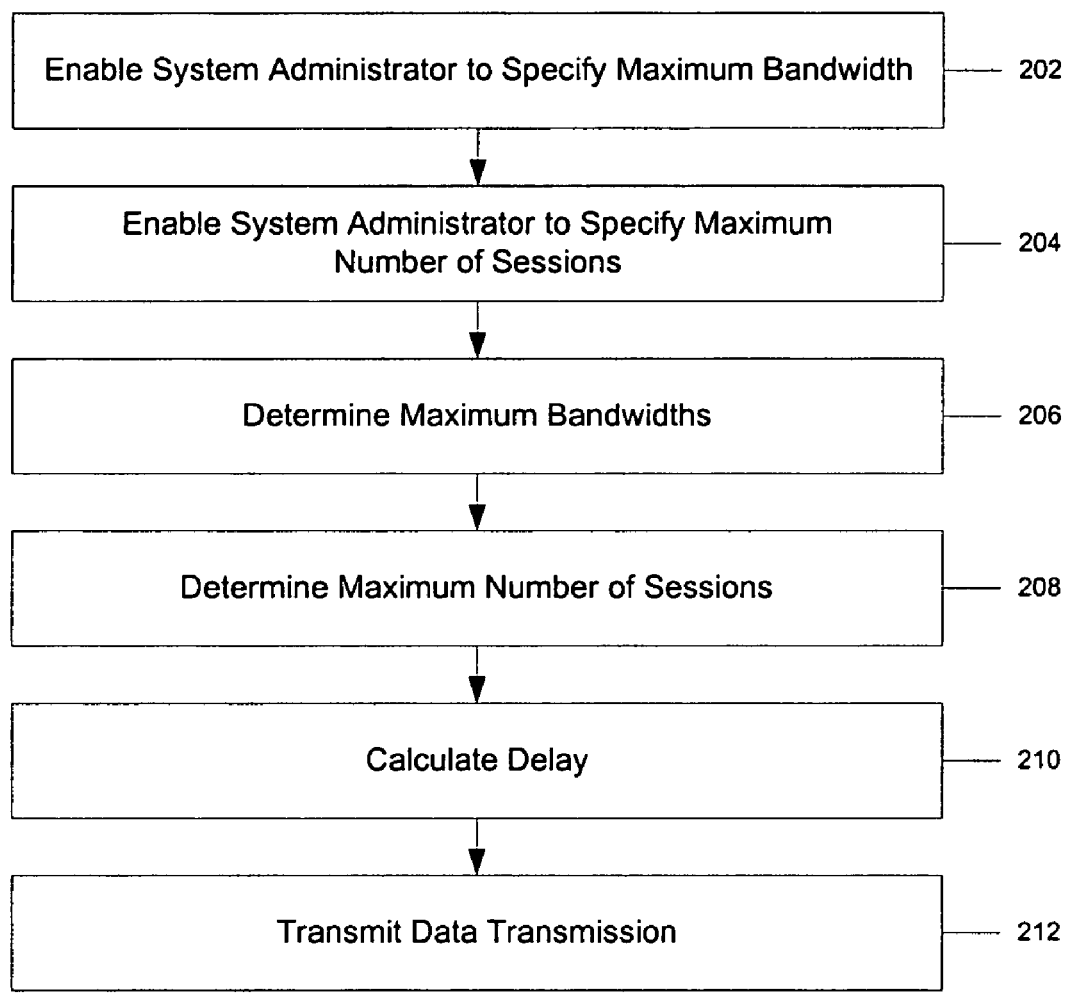
FIG. 2 is a schematic block diagram of a method for delaying data transmissions from a TFTP server according to one embodiment of the invention.

FIG. 2 illustrates a method for delaying data transmissions from a server according to one embodiment of the invention. The method may include an enable system administrator to specify maximum bandwidth step 202. In step 202, the system administrator may specify the maximum bandwidth that a TFTP server may use for sending a data transmission. The system administrator may be, for example, a system administrator of a service provider that provides Internet access to an end-user. Step 204 may be used to enable a system administrator to specify a maximum number of sessions that may operate substantially simultaneously. The method may also include a determine maximum bandwidth step 206. In step 206, a maximum bandwidth to be used for transmitting a data transmission may be determined. The maximum bandwidth may be a maximum specified by a system administrator in step 202, a default maximum bandwidth set by a system administrator or other.

A determine maximum number of sessions step 208 may be used to determine a maximum number of sessions that may operate substantially simultaneously. The maximum number of sessions may be specified by a system administrator or other user, a default maximum number of sessions set by a system administrator or other manner of determining a maximum number of sessions. After determining the maximum number of sessions, a delay for sending a data transmission may be calculated in step 210. Step 210 may calculate a delay based on the maximum number of sessions, a time delay, a number of data transmissions, or other method. According to one embodiment of the invention, step 210 calculates a delay using a formula of:

$$D=1000*(1/(B*1,000,000))*P*8*S \qquad \text{Formula 1}$$

where D is the delay in milliseconds, B is a specified bandwidth in megabits per second, P is a data packet sized in bytes, 8 is a conversion factor from bits to bytes, and S is a maximum number of sessions.

For cable modems using the TFTP, P may be 512 bytes which is the packet size fixed by the TFTP. The bandwidth B and maximum number of sessions S may be specified by a system administrator for establishing a delay in sending a data sent. Based on the data packet size, maximum bandwidth, and maximum number of sessions, a delay may be calculated in step 210 to determine when a data transmission should be transmitted. If the delay is a time delay, for example, in milliseconds, the data transmission may not be transmitted until the delay time has expired. After the delay has expired, the data transmission may then be transmitted using step 212.

According to another embodiment, the delay may be based on a number of data transmissions sent. For example, a data transmission may not occur until a predetermined number of data transmissions have been sent. A data transmission may be delayed until, for example, fifteen (15) data transmissions have been sent. Additionally, a data transmission may be delayed until fifteen (15) data transmissions have been sent within a predetermined time period, for example, one (1) second.

Figure 3:
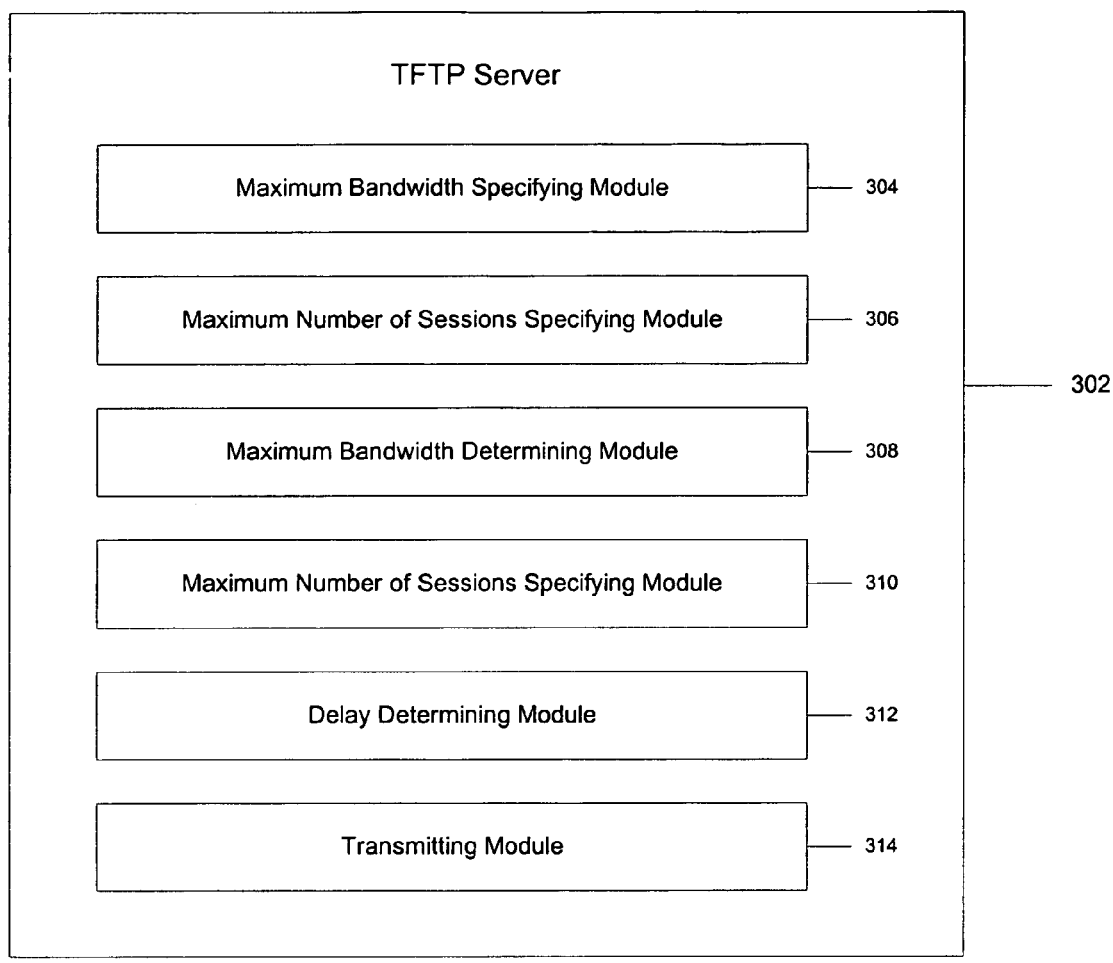
FIG. 3 is a schematic block diagram of a system for delaying data transmissions from a TFTP server according to one embodiment of the invention.

FIG. 3 illustrates a system for delaying data transmissions from a TFTP server 302 according to one embodiment of the invention. TFTP server 302 may include a maximum bandwidth specifying module 304, session specifying module 306, maximum bandwidth determining module 308, maximum number of sessions specifying module 310, delayed determining module 312, and transmitting module 314.

Maximum bandwidth specifying module 304 may enable a system administrator to specify a maximum bandwidth for sending a data transmission. The maximum bandwidth may be specified as a percentage of bandwidth available, for example, ten (10) percent, a fixed number, for example, one (1) megabit per second, or other mechanism. If a system administrator does not specify a maximum bandwidth, a default maximum bandwidth set by, for example, a system administrator may be used. Session specifying module 306 may be used to enable a system administrator to specify a maximum number of sessions that may be operated simultaneously. A system administrator may specify a maximum or default number of sessions that may be operated simultaneously.

Maximum bandwidth determining module 308 may be used to determine a maximum bandwidth to be used in sending a data transmission. The maximum bandwidth may be a maximum bandwidth specified by the system administrator in step 304, a default bandwidth specified by a system administrator or other user, or other mechanism. Maximum number of sessions specifying module 310 may identify a maximum number of sessions that may be operated substantially simultaneously. The maximum number of sessions specified may be the number of sessions specified by a system administrator using maximum number of sessions specifying module 306, a default maximum number of sessions specified by a system administrator or other user, or other mechanism.

Delay determining module 312 may determine a delay for transmitting the data transmission according to the maximum bandwidth and number of sessions specified. The delay may be calculated as described above. After determining the delay, transmitting module 314 may be used to transmit the data transmission after the delay calculated has expired.

FIG. 4 is a schematic block diagram of a cable network system. The system may include one or more cable modems 402*a*-402*n*, head-end 404, and Internet 406. Head-end 404 may include a DHCP server 408 and a TFTP server 410. Cable modems 402*a*-402*n* may be in communication with head-end 404 over, for example, a cable network. Cable modems 402*a*-402*n* may request one or more data transmissions from head-end 404. For example, at start-up, cable modems 402*a*-402*n* may request initialization information from head-end 404. Head-end 404 may receive the request for initialization information and return the initialization information using DHCP server 408. DHCP server 408 may respond to the request for initialization information by transmitting to cable modems 402*a*-402*n* an IP address for the cable modem requesting initialization information, the IP address for TFTP server 410, and the name of a configuration file for the cable modem requesting the initialization information. Cable modems 402*a*-402*n* may then request a configuration file from TFTP server 410 using the IP address for TFTP server 410 and the name of the configuration file received from DHCP server 408. Cable modems 402*a*-402*n* may then use the configuration files for configuration purposes.

Head-end 404 may also enable cable modems 402*a*-402*n* to transmit requests via Internet 406. Cable modems 402*a*-402*n* may be used to enable high-speed Internet access to one or more web sites. Cable modems 402*a*-402*n* may be in communication with or provided at one or more clients (not shown). Internet access may be provided using any known method.

The foregoing description for a system and method for delaying data transmissions from a server is illustrative, and changes in the above construction and sequences of operation may occur to persons skilled in the art. For example, although multiple modules are shown for carrying out the invention, additional or fewer modules may be used and multiple modules may be positioned in various locations. Additionally, the steps for carrying out the invention may be supplemented, reduced, or rearranged. Although the invention has been described in terms of a TFTP server and cable modem devices, the invention may be used with any type of server or end-user device. Furthermore, the invention may be used with data transmissions other than configuration file requests and parameters specified by a system administrator may be specified by an end-user or other user. Therefore, the scope of the invention is intended to be limited only by the following claims.

What is claimed is:

1. A method for data transmissions from a server, comprising the steps of:
   a) configuring a maximum bandwidth for at least one data transmission;
   b) determining the maximum bandwidth for the at least one data transmission;
   c) determining a delay for the at least one data transmission based on the maximum bandwidth specified, wherein the step of determining a delay determines the delay based on at least a data packet size, bandwidth, and number of sessions, and wherein the step of determining a delay determines the delay from a formula of:

$$D=1000*(1/(B*1000000))*P*8*S$$

where D is the delay in milliseconds, B is a bandwidth in megabits per second, P is a data packet size in bytes, and S is a maximum number of sessions; and
   d) transmitting the at least one data transmission after the delay has expired.

2. The method of claim 1, wherein the server comprises a trivial file transfer protocol server.

3. The method of claim 1, further comprising the step of:
   e) enabling the user to specify a maximum number of sessions that may be operated substantially simultaneously.

4. The method of claim 3, wherein the delay is based on at least the maximum number of sessions specified.

5. The method of claim 1, wherein the delay comprises a time delay.

6. The method of claim 1, wherein the delay is based on at least a number of data transmissions.

7. The method of claim 1, wherein the step of configuring configures the maximum bandwidth based on a desired bandwidth specified by a user.

8. The method of claim 1, wherein the step of configuring configures the maximum bandwidth based on a predetermined value.

9. A system for data transmissions from a server, comprising:
   a maximum bandwidth configuring module that configures a maximum bandwidth for at least one data transmission;
   a maximum bandwidth determining module that determines the maximum bandwidth for the at least one data transmission;
   a delay determining module that determines a delay for the at least one data transmission based on the maximum bandwidth specified, wherein the delay determining module determines the delay based on at least a data packet size, bandwidth, and number of sessions, and wherein the delay determining module determines the delay from a formula of:

$$D=1000*(1/(B*1000000))*P*8*S$$

where D is the delay in milliseconds, B is a specified bandwidth in megabits per second, P is a data packet size in bytes, and S is a maximum number of sessions; and
   a transmitting module that transmits the at least one data transmission after the delay has expired.

10. The system of claim 9, wherein the server is a trivial file transfer protocol server.

11. The system of claim 9, further comprising a session specifying module that enables the user to specify a maximum number of sessions that may be operated substantially simultaneously.

12. The system of claim 11, wherein the delay is based on at least the maximum number of sessions specified.

13. The system of claim 9, wherein the delay comprises a time delay.

14. The system of claim 9, wherein the delay is based on at least a number of data transmissions.

15. The system of claim 9, wherein the maximum bandwidth configuring module configures the maximum bandwidth based on a desired bandwidth specified by a user.

16. The system of claim 9, wherein the maximum bandwidth configuring module configures the maximum bandwidth based on a predetermined value.

17. The method of claim 1, wherein the maximum bandwidth is specified by a user.

18. The system of claim 9, wherein the maximum bandwidth is specified by a user.

19. The method of claim 1, wherein the data transmission is sent from the server to a cable modem.

20. The system of claim 9, wherein the data transmission is sent from the server to a cable modem.

* * * * *